UNITED STATES PATENT OFFICE 2,178,022

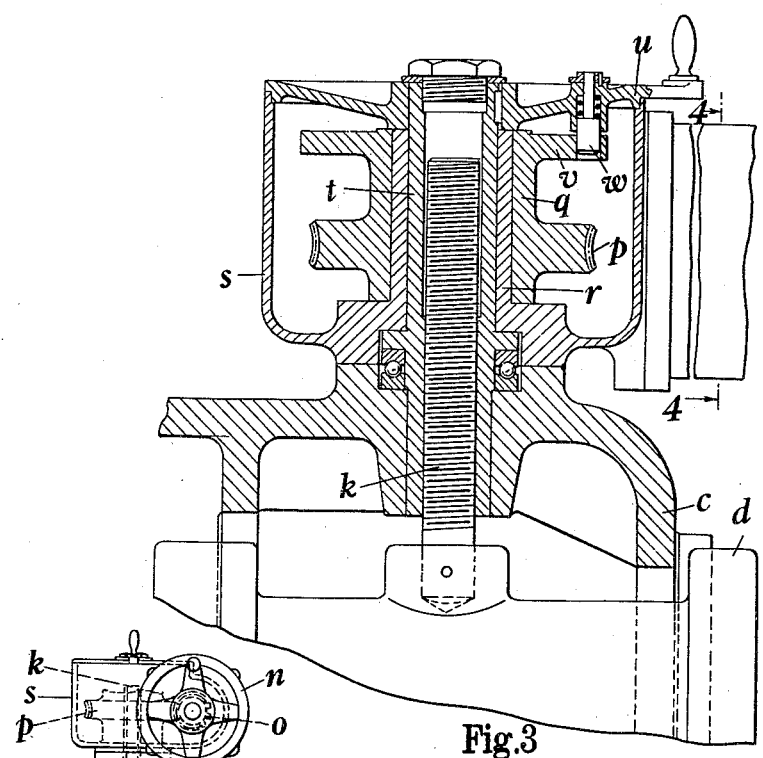
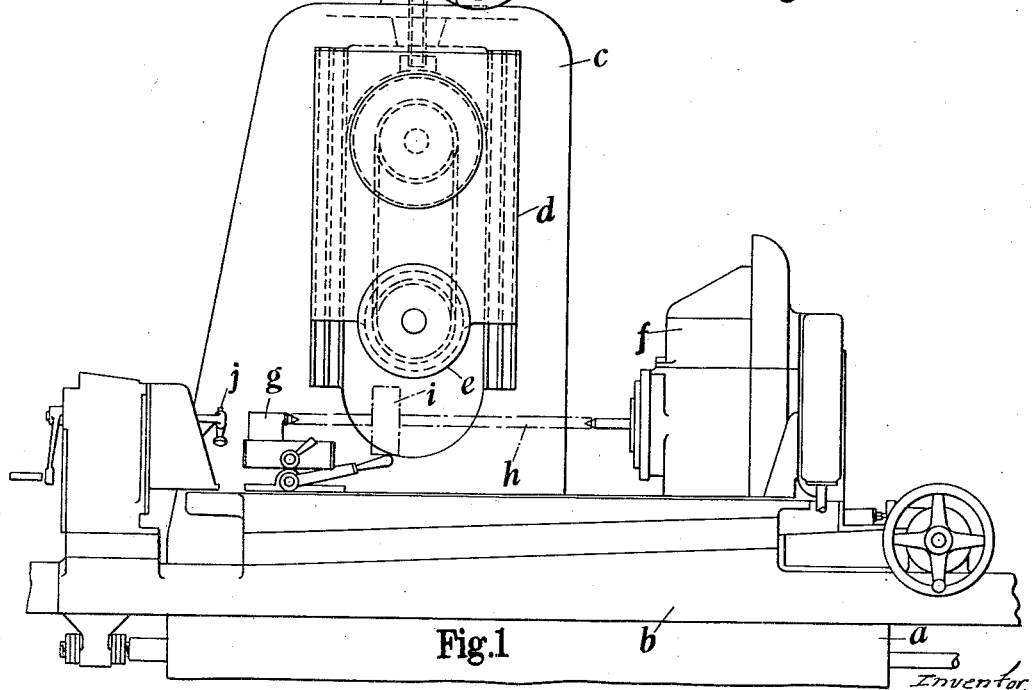

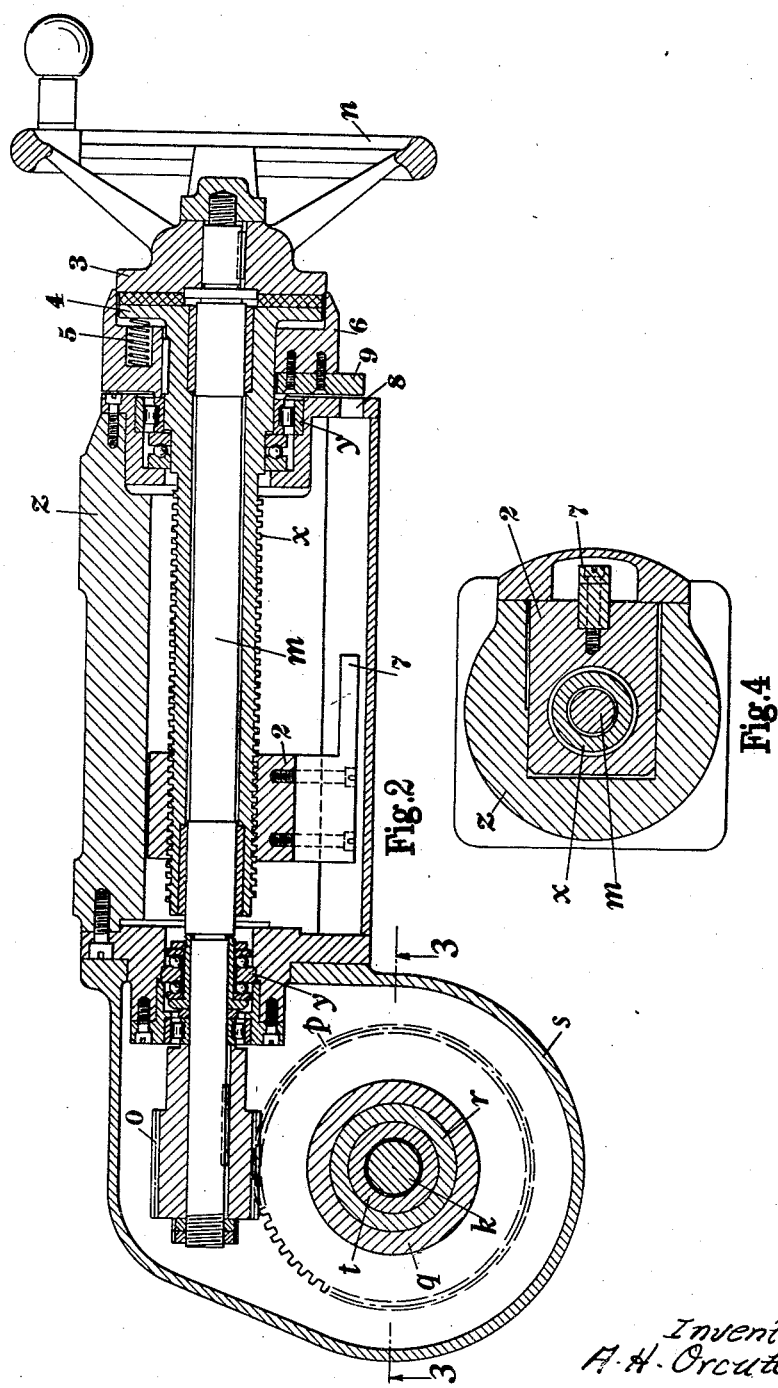

METAL AND OTHER GRINDING OR CUTTING MACHINE

Arthur Hitchcock Orcutt, Birmingham, England, assignor to The Gear Grinding Company Limited, Birmingham, England Application March 10, 1939, Serial No. 261,147
In Great Britain April 14, 1938

5 Claims. (Cl. 51—165)

This invention relates more particularly to machines for grinding toothed wheels, splined shafts and the like by means of a formed grinding wheel, but it is also applicable to other analogous grinding or cutting machines such as machines for producing flat or cylindrical surfaces and adapted to produce work pieces to a high standard of accuracy. The object of the invention is to provide improved means for enabling the machine attendant to know when for a given work piece the relative feed movement of the grinding or cutting means and the work piece has been effected to a predetermined extent.

In the grinding of toothed wheels, splined shafts or other work pieces, by a formed grinding wheel which requires to be periodically trimmed, it is a known practice to mount the trimming tool on the machine so that its position relative to the rotative axis of the work piece corresponds to the finished size of the work piece. After the trimming tool has been properly adjusted to suit a particular work piece, its position can be used to determine the finished condition of a succession of similar work pieces. The present invention utilises this fact in a manner to be hereinafter explained.

The invention comprises the combination of a spindle rotatable by hand for effecting the feed movements, a screw-threaded spindle, a slidable nut actuated by the screw-threaded spindle, and a friction clutch interconnecting the two spindles, the nut being adapted to arrest at a predetermined position of its travel the rotation of the screw-threaded spindle, for the purpose of indicating to the attendant that the desired feed movement has been completed.

In particular, the invention comprises a combination as aforesaid in which the screw-threaded spindle is in the form of a sleeve surrounding the other spindle, and in which an extension from the nut is adapted to engage a member associated with the screw-threaded spindle.

In the accompanying sheets of explanatory drawings:

Figure 1 is a diagrammatic front elevation of a toothed wheel grinding machine provided with the invention.

Figure 2 is a sectional plan illustrating the invention and drawn to a larger scale than Figure 1.

Figure 3 is a section on the line 3—3 of Figure 2 looking in the direction of the arrows.

Figure 4 is a section on the line 4—4 of Figure 3 looking in the direction of the arrows.

The toothed wheel grinding machine illustrated diagrammatically in Figure 1 comprises a bed $a$ carrying a horizontally movable slide $b$ and a vertical guide $c$. The latter supports a vertical slide $d$ on the lower end of which is mounted the formed grinding wheel $e$. On the slide $b$ are mounted a headstock $f$ and a tailstock $g$ for supporting opposite ends of a work spindle $h$. The work piece $i$ is mounted on the spindle $h$ by which it is intermittently rotatable from one angular position to another through the medium of indexing mechanism contained in the headstock $f$, and on the slide $b$ of the machine is mounted the tool $j$ for periodically trimming the working surfaces of the grinding wheel $e$. As already stated the position of the trimming tool $j$ relative to the axis of the work piece $i$ is initially adjusted to correspond with the finished size of the work piece.

In applying my invention as shown to the machine above described, I arrange for the grinding wheel feed screw $k$, which moves the slide $d$ and grinding wheel $e$ towards or away from the work piece $i$, to be operated by a horizontal or other spindle $m$ which is rotatable by a hand wheel $n$ secured to its outer end, the other end of this spindle being operatively connected to the feed screw $k$. This connection is effected in the example shown by the engagement of a worm $o$ on the spindle $m$ with a worm wheel $p$ on a hollow cylindrical member $q$. The latter is rotatable on a vertical hollow bearing $r$ which is formed in a housing $s$ containing the worm gearing $o$, $p$, and which contains the upper end of a rotatable but axially immovable sleeve $t$ on the feed screw $k$. The sleeve $t$ is in screw thread engagement with the feed screw $k$, and has secured to its upper end a hand wheel $u$ which is detachably connected to a flange $v$ on the upper end of the cylindrical member $q$ by a spring-loaded catch $w$. The hand wheel $u$ serves, when the catch $w$ is released from the member $q$, to enable the sleeve $t$ to be rotated rapidly for raising or lowering the slide $d$. The normal or slow rotation of the sleeve $t$ for giving fine adjustment of the slide $d$ is effected by the other hand wheel $n$ through the spindle $m$. This spindle $m$ passes through a hollow spindle $x$ which is externally screw threaded, the two spindles $m$, $x$ being supported by bearings $y$ in a housing $z$ which is secured at one end to the housing $s$ of the worm gearing above mentioned, and which encloses the spindles over the greater part of their lengths. On the hollow spindle $x$ is mounted a slidable nut 2, this latter being arranged to move along a guide formed in or by the interior of the spindle housing $z$. At their outer ends the two spindles $m$, $x$ are interconnected by a friction clutch which, in the example shown, consists of a pair of flat faced members 3, 4 formed or secured on the operating hand wheel $n$ and hollow spindle $x$ respectively. These friction clutch members are held in contact with each other by springs as 5 acting on the member 4, the springs being held by another member 6 which is rotatable with the hollow spindle $x$. The nut 2 is formed or provided with an extension 7 which is adapted at one end to pass through a hole 8 in the corresponding end of the spindle housing $z$ into the path of a radial projection 9 on the member 6. In this position the nut extension 7 serves as a stop for the projection 9, and the attendant can see when the latter projection comes into contact with the stop.

After the initial adjustment of the trimming tool $j$ has been effected, which adjustment remains unaltered while work pieces of a given size are being operated on, the attendant first brings this tool to the trimming position beneath the grinding wheel $e$, and then by rotation of the hand operated spindle $m$ he causes the wheel surface to be brought under the action of the trimming tool. In this operation the nut extension 7 is moved into the path of the rotary projection 9 so that the latter, by coming into contact with the nut extension, causes the screw-threaded spindle $x$ to be arrested, and during continued downward movement of the grinding wheel $e$ towards the trimming tool $j$, the friction clutch 3, 4 slips. By reason of the fact that the trimming tool $j$ is adjusted to correspond with the finished size and position of the work piece $i$, the contact of the rotary projection 9 with the nut extension 7 determines the maximum feed movement to be given to (or terminal position of) the wheel $e$ in the grinding operation. After trimming the attendant rotates the hand operated spindle $m$ in the direction for raising the grinding wheel $e$, and is then ready for working the machine. After the work piece $i$ has been brought to the grinding position, the attendant gradually feeds the wheel $e$ down on to the work piece, and when the rotary projection 9 comes into contact with the nut extension 7 he knows that the wheel has been fed to the desired extent. Should the wheel $e$ require to be trimmed again before this or any other work piece has been completed, the fact still remains that the finishing position of the grinding wheel is always determined by the contact of the rotary projection 9 with the nut extension 7.

The invention is not limited to the example above described as it may be applied in various ways with appropriate modification of detail to machines of different kinds. For example, the feed movements above described may be applied to work pieces which (together with the trimming tool) are movable relatively to a grinding wheel occupying a fixed position, though in grinding machines it is usually more convenient to impart the feed movements to the wheel. Also the invention may be applied to metal or other cutting (as distinct from abrasive) machines.

Having thus described my invention what I claim as new and desire to secure by Letters Patent is:

1. For use in metal and other grinding or cutting machines, a feed mechanism comprising the combination of a spindle rotatable by hand for effecting the feed movements, a screw-threaded spindle, a slidable nut actuated by the screw-threaded spindle, a member rotatable with the screw-threaded spindle and engageable by the nut when the latter assumes a predetermined position, and a friction clutch interconnecting the two spindles, the nut being adapted by its engagement with the said member to arrest the rotation of the screw-threaded spindle, for the purpose of indicating to the attendant that the desired feed movement has been completed.

2. For use in metal and other grinding or cutting machines, a feed mechanism comprising the combination of a spindle rotatable by hand for effecting the feed movements, a screw-threaded spindle in the form of a sleeve surrounding the hand operable spindle, a slidable nut actuable by the screw-threaded spindle, an extension on the nut, a member associated with the screw-threaded spindle and engageable by the nut extension when the latter assumes a predetermined position, and a friction clutch interconnecting the two spindles, the nut extension being adapted by its engagement with the said member to arrest the rotation of the screw-threaded spindle for the purpose of indicating to the attendant that the desired feed movement has been completed.

3. For use in metal and other grinding or cutting machines, a feed mechanism comprising the combination of a spindle rotatable by hand for effecting the feed movements, a screw-threaded spindle in the form of a sleeve surrounding the hand operable spindle, a slidable nut actuable by the screw-threaded spindle, an extension on the nut, a rotatable member associated with the screw-threaded spindle and provided with a radial projection which is engageable by the nut extension when the latter assumes a predetermined position, and a friction clutch interconnecting the two spindles, the nut extension being adapted by its engagement with the said projection to arrest the rotation of the screw-threaded spindle for the purpose of indicating to the attendant that the desired feed movement has been completed.

4. For use in metal and other grinding or cutting machines, a feed mechanism comprising the combination of a spindle rotatable by hand for effecting the feed movements, another rotatable spindle in the form of an externally screw-threaded sleeve mounted on the hand operable spindle, a non-rotatable but slidable nut mounted on the screw-threaded spindle and provided with an extension, a member mounted on and rotatable with the screw-threaded spindle, a projection provided on the said member and engageable by the nut extension when the latter assumes a predetermined position, and a friction clutch having interacting parts provided respectively on and interconnecting the outer ends of the two spindles, the nut extension being adapted by its engagement with the said projection to arrest the rotation of the screw-threaded spindle for the purpose of indicating to the attendant that the desired feed movement has been completed.

5. For use in metal and other grinding or cutting machines, a feed mechanism comprising the combination of a spindle rotated by hand for effecting the feed movements, another spindle in the form of an externally screw-threaded sleeve mounted on the hand operable spindle, a housing serving to support the two spindles, a nut mounted on the screw-threaded spindle and slidable but non-rotatable in the housing, an extension on the nut, the said housing being formed at one end with an aperture through which the nut projection can pass, a member mounted on and rotatable with the screw-threaded spindle, a projection provided on the said member and engageable by the nut extension when the latter extends through the said aperture, and a friction clutch having interacting parts provided respectively on and interconnecting the outer ends of the two spindles, the nut extension being adapted by its engagement with the said projection to arrest the rotation of the screw-threaded spindle for the purpose of indicating to the attendant that the desired feed movement has been completed.

ARTHUR HITCHCOCK ORCUTT.